(12) United States Patent
Hulyalkar et al.

(10) Patent No.: US 6,850,563 B1
(45) Date of Patent: Feb. 1, 2005

(54) DATA SLICER FOR COMBINED TRELLIS DECODING AND EQUALIZATION

(75) Inventors: Samir N. Hulyalkar, Newtown, PA (US); Thomas J. Endres, Ottsville, PA (US); Troy A. Schaffer, Newtown, PA (US); Christopher H. Strolle, Fort Washington, PA (US)

(73) Assignee: Netwave Communications, Langhorne, PA (US)

( * ) Notice: Subject to any disclaimer, the term of this patent is extended or adjusted under 35 U.S.C. 154(b) by 705 days.

(21) Appl. No.: 09/716,651

(22) Filed: Nov. 20, 2000

Related U.S. Application Data

(63) Continuation-in-part of application No. 09/099,730, filed on Jun. 19, 1998, and a continuation-in-part of application No. 09/100,705, filed on Jun. 19, 1998.

(51) Int. Cl.[7] ............................. H03H 7/30; H03H 7/40; H03K 5/159
(52) U.S. Cl. ..................... 375/233; 375/262; 375/341; 375/286; 714/795
(58) Field of Search ................................ 375/262, 265, 375/341, 232, 233, 346, 286; 714/795, 792, 796

(56) References Cited

U.S. PATENT DOCUMENTS

| | | | |
|---|---|---|---|
| 5,056,117 A | | 10/1991 | Gitlin et al. |
| 5,588,025 A | | 12/1996 | Strolle et al. |
| 5,757,855 A | | 5/1998 | Strolle et al. |
| 5,802,116 A | * | 9/1998 | Baker et al. ................. 375/341 |
| 5,923,711 A | * | 7/1999 | Willming ..................... 375/287 |
| RE36,980 E | * | 12/2000 | Kim et al. ................... 348/608 |
| 6,177,951 B1 | * | 1/2001 | Ghosh ........................... 348/21 |
| 6,418,164 B1 | * | 7/2002 | Endres et al. ................ 375/232 |

OTHER PUBLICATIONS

Bernard Sklar, "Digital Communications Fundamentals and Applications", 1988, published by PTR Prentice Hall, pp. 333-337.*

* cited by examiner

*Primary Examiner*—Phuong Phu
(74) *Attorney, Agent, or Firm*—RatnerPrestia

(57) ABSTRACT

A slicer for a decision feedback error equalizer system that processes trellis encoded data using the ATSC trellis code is implemented in two parts. A first part includes a trellis decoder that estimates a single bit of the symbol. The second part includes two partial trellis decoders. A multiplexer directs the received digital samples to one of the two trellis decoders responsive to the estimated symbol. An alternative slicer estimates two bits of the output symbols and selects from among four decoders to fully decode the symbols. The slicer is used in an equalizer having adaptive filters that may operate either on passband or baseband signals. The slicer is used both to recover the carrier signal on which the symbols are modulated and to provide symbols to the second filter that are used to determine filter coefficients for the second filter.

26 Claims, 8 Drawing Sheets

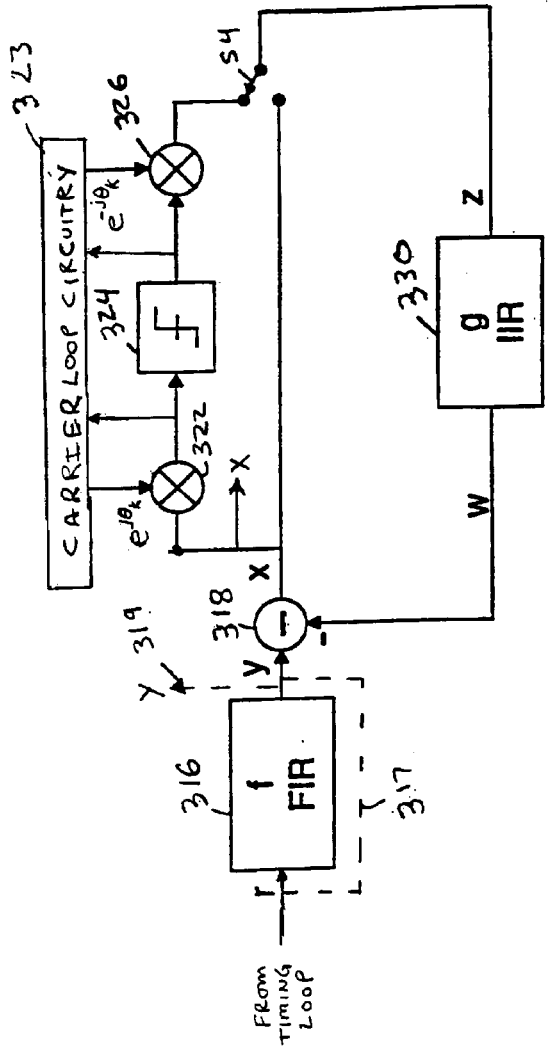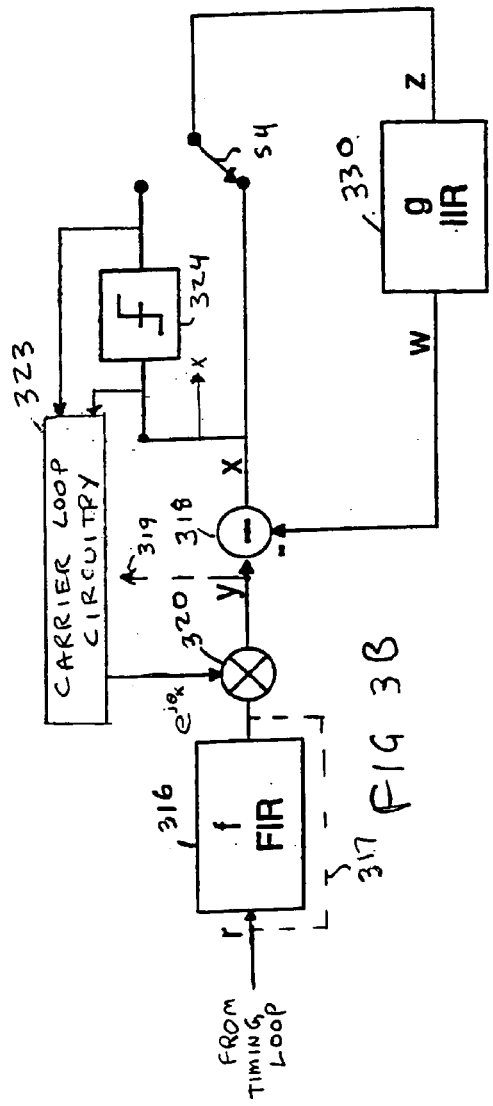

DATA SLICER FOR COMBINED TRELLIS DECODING AND EQUALIZATION

This application is a continuation-in-part of U.S. patent application Ser. No. 09/099,730, filed Jun. 19, 1998 and U.S. patent application Ser. No. 09/100,705 filed Jun. 19, 1998, the contents of which are incorporated herein by reference.

BACKGROUND OF THE INVENTION

The present invention concerns data slicers or quantizers and in particular, a data slicer suitable for use in a baseband or passband decision-feedback equalizer.

Equalizers are typically used in coded digital communications systems to compensate for multipath/linear filtering effects caused by the transmission channel. These effects are commonly referred to as channel impairments and include signal distortion that may occur in the transmitter, in the receiver or in the channel through which the signal is transmitted. The equalizer is an adaptive filter, often implemented as a finite impulse response (FIR) filter, an infinite impulse response (IIR) filter or a combination of FIR and IIR filters. Each filter has a plurality of coefficients that are adapted to minimize an error criterion. This error criterion may be, for example, the mean-square error between a transmitted training signal and the received training signal. A typical equalizer maintains a copy of the transmitted training signal to compare with the received training signal. It is generally believed that a decision-feedback equalizer (DFE) has better asymptotic performance than a linear equalizer as described in a text book by J. G. Proakis, entitled *Digital Communications*.

A typical DFE is shown in FIG. 1. The received signal is applied to an FIR filter and the output signal produced by the FIR filter is applied to an IIR filter. The IIR filter includes a subtracter 111, a slicer 112 and an IIR filter section 114. The subtracter 111 subtracts the filtered signal provided by the IIR filter section 114 from the output signal of the FIR filter 110. The slicer 112 quantizes the signal provided by the subtracter 111 to produce an approximation of the signal that was transmitted. The IIR filter section, which may be, for example, an FIR filter in a feedback loop, processes the quantized signal to produce the signal that is subtracted by the subtracter 111. For an uncoded modulation scheme, the DFE uses the slicer to get decisions for the feedback portion. The slicer is a nearest element decision device which returns the source constellation member closest to its input. In decision directed operation, the output signal of the slicer is compared to its input signal to determine in what way the coefficients of the FIR and IIR filter sections should be updated to minimize any differences between the signal that was recovered and the known training signal.

For a coded modulation scheme, it may be desirable to replace the slicer with a decoder, that may include, for example, a trellis decoder, a deinterleaver, and a Reed Solomon (RS) decoder. The use of such a decoder, however, delays the decision on what symbol was transmitted by several symbol periods. These delays can be prohibitive for the DFE, since it relies on canceling the inter-symbol-interference of the previous symbols on the current symbol by using previously available decisions. Hence, the state of the art has typically not used a complete decoder, but a range of simplified decoders including the simple slicer 112, that does not perform any decoding. A typical problem with using only a slicer in a DFE is a loss in performance due to incorrect decisions. Because an incorrect decision used in the DFE to remove inter-symbol interference (ISI) can cause further errors, this performance loss is known as "error propagation."

More complex decoding techniques may also be used, for example, Reduced-State Sequence Estimation (RSSE) and parallel decision feedback decoding (PDFD). These techniques are described in an article by V. Eyuboglu and S. Qureshi, entitled "Reduced-State Sequence Estimation for Coded Modulation on Intersymbol Interference Channels" *IEEE Journal on Selected Areas of Communications*, August 1989. Furthermore, U.S. Pat. No. 5,056,117 entitled DECISION-FEEDBACK EQUALIZATION WITH TRELLIS CODING to R. Gitlin, describes a method by which multiple possible decisions are fed back and the best among them is chosen using a given criteria. Other techniques are described in an article by A. Duel-Hallen and C. Heegard, entitled "Delayed Decision-Feedback Equalization", *IEEE Transactions on Communications* May 1989. All of the above cited references are incorporated herein by reference for their teachings on combined equalization and decoding techniques.

Generally the common idea among these decoders is to use multiple possible decisions or to use a more complicated trellis decoder that includes a channel state estimate. The implementation complexity of these approaches, however, is significant and may undesirably add to the cost of the decoder.

U.S. Pat. No. 5,923,711 entitled SLICE PREDICTOR FOR A SIGNAL RECEIVER to Willming describes a slicer for a trellis coded vestigial sideband (VSB) signal that estimates a current symbol using a partial estimate of the current symbol which is derived from the previous symbol. The partial estimate is derived only from the previous symbol and is used to reduce the probability of error in the estimate of the current symbol. The system disclosed by Willming recovers carrier frequency from the pilot signal of the VSB signal. The pilot signal of a VSB signal, is not a good reference, however, as it may be corrupted both in frequency and phase by multipath distortion. In addition, the system disclosed by Willming may not operate properly when used with VSB signals that do not have pilot signals.

SUMMARY OF THE INVENTION

The present invention is embodied in a quantizer that may be used to recover N-bit symbols from successive channel impaired input samples representing a trellis encoded signal. The quantizer includes a partial trellis decoder that traces back at least one symbol to generate an estimate of a subset of the N bits of each symbol and, based on the estimate, selects a decision device for a reduced constellation to generate an estimate of the N bits.

According to another aspect of the invention, the trellis encoder that generates the input samples is based on a set-partitioned code with feedback convolutional encoding and the partial trellis decoder computes path metrics for the current symbol based on path metrics of the previous symbol. The best path metric of the previous symbol is used to select the reduced-constellation decision device that produces the current symbol.

According to yet another aspect of the invention, the trellis encoder that generated the input samples is based on a set-partitioned code and the partial trellis decoder computes path metrics for the current symbol based on path metrics of the previous symbol. The best path metric from among the path metrics of the current symbol, corresponding to a subset of states for the previous symbol, is used to select the reduced-constellation decision device that produces the current symbol.

According to another aspect of the invention, the quantizer is used in an equalizer for a modulated digital signal.

The equalizer includes a first adaptive filter that processes passband signals and a second adaptive filter that processes passband signals.

According to yet another aspect of the invention, the quantizer is used in an equalizer for a modulated digital signal. The equalizer includes a first adaptive filter that processes passband signals, a demodulator and a second adaptive filter that processes baseband signals.

According to another aspect of the invention, the quantizer is used in an equalizer for a modulated digital signal. The equalizer includes a first adaptive filter that processes baseband signals, a demodulator and a second adaptive filter that processes baseband signals.

BRIEF DESCRIPTION OF THE DRAWINGS

FIG. 3A is a block diagram of an exemplary equalizer suitable for use in the digital signal receiver shown in FIG. 2.

FIG. 3B is a block diagram of an alternative equalizer suitable for use in the digital signal receiver shown in FIG. 2.

DETAILED DESCRIPTION

Figure 1:
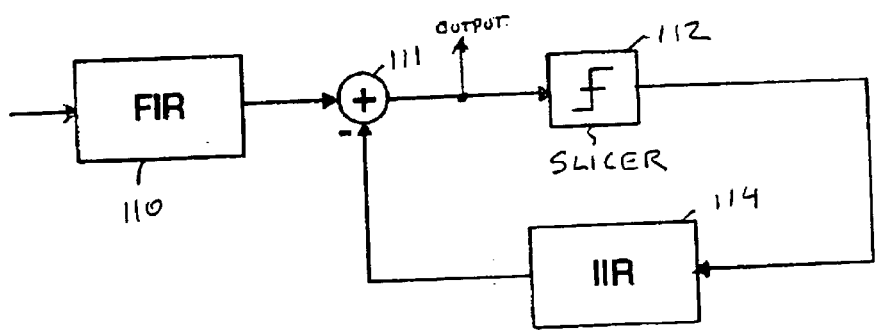
FIG. 1 (prior art) is a block diagram of a decision feedback equalizer.
Figure 2:
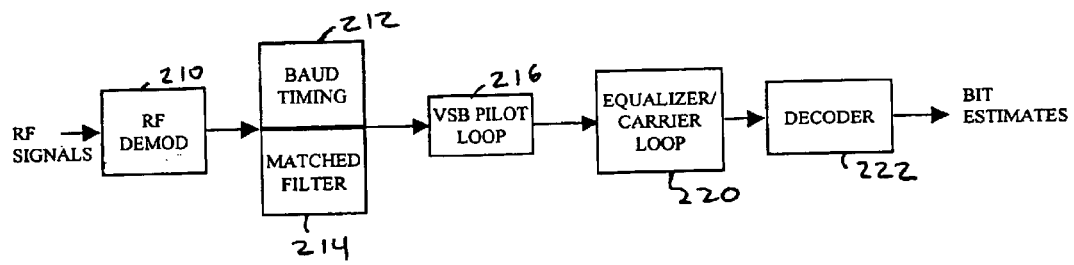
FIG. 2 is a block diagram of a digital signal receiver and decoder which includes an embodiment of the invention.

An exemplary receiver architecture is illustrated in FIG. 2. A radio frequency (RF) demodulator 210 receives an RF signal that has been modulated using VSB and translates the frequency spectrum of the received signal to near baseband, so that its center frequency is approximately zero. The exemplary embodiment of the invention may also be used with QAM signals, as described in copending patent application Ser. No. 09/100,705 to Strolle et al. filed Jun. 19, 1998. For the sake of simplicity, only the VSB demodulator is described below.

The output signal of the demodulator 210 is not a demodulated baseband signal but a modulated passband signal. The exemplary RF demodulator is a synchronous demodulator that provides both in-phase (I) and quadrature-phase (Q) signal components. In the drawing Figures, the I and Q signal components are shown as a single line even though they may be conveyed by two conduction paths.

The RF demodulator 210 also generates digital samples of the RF signal. These samples may be taken at a sample rate greater than the symbol rate (baud rate) of the modulated signal. In the exemplary embodiment of the invention, the samples provided by the RF demodulator 210 are at approximately four-times the symbol rate.

The passband signal provided by the RF demodulator 210 is first interpolated and then filtered by a matched filter 214 before being sampled by the baud timing recovery circuit 212. The frequency spectrum of the matched filter 214 depends on how the signals were filtered at the transmitter. If, for example, the transmitter (not shown) applied a square-root raised cosine frequency response characteristic to the digital signal, the matched filter 214 also applies a square-root raised cosine characteristic. The cascade combination of these two filters provides a signal having minimal inter-symbol interference (ISI).

Baud synchronization by the baud timing circuitry 212 is accomplished without knowing the exact carrier frequency or phase by band-edge, phase-lock techniques. These techniques are described in U.S. Pat. No. 5,872,815 entitled APPARATUS FOR GENERATING TIMING SIGNALS FOR A DIGITAL TELEVISION RECEIVER and U.S. Pat. No. 5,799,037 entitled RECEIVER CAPABLE OF DEMODULATING MULTIPLE MODULATION DIGITAL FORMATS that are incorporated herein by reference for their teaching on baud synchronization. This method introduces minimal additional error under perfect signaling conditions.

Next, the VSB signal is passed through the VSB pilot loop 216. This loop synchronizes a local oscillator signal to the pilot component of the VSB signal. This pilot signal is described in the above-referenced ATSC Digital Television Standard.

The output signal of the VSB pilot loop 216 is applied to an equalizer/carrier loop recovery circuit 220, described below, that includes an embodiment of the present invention. This circuitry compensates for multipath distortion and for the frequency response characteristic of the transmission channel. The loop recovery circuit also includes a phase locked loop (PLL) that determines the frequency and phase of the residual carrier signal to provide samples of the completely demodulated signal for application to the decoder 222. The decoder 222 may include a VSB decoder.

An exemplary adaptive equalizer structure is shown in FIG. 3A. This equalizer includes a forward or finite impulse response (FIR) section 316 and a feedback or infinite impulse response (IIR) section including a summing circuit (e.g. subtracter 318) and IIR filter element 330. Although the exemplary embodiment shows both an FIR filter and an IIR filter, it is contemplated that an equalizer according to the subject invention may be made using only the FIR filter section 316 or only the IIR filter section. These alternate configurations are illustrated by the connections 317 and 319, shown in phantom, in FIGS. 3A and 3B. If the equalizer includes only the IIR section, then the FIR filter 316 is replaced by the connection 317. If only the FIR filter 316 is used, then the subtracter 318 and filter element 330 are removed and the output of the equalizer is the signal y as indicated by the connector 319 or the output symbols provided by the slicer 324, as described below.

In the exemplary embodiment of the invention shown in FIG. 3A, demodulated QAM signals from the timing loop are applied to the FIR filter section 316. The FIR section receives data at a residual carrier frequency offset because, as described above, the RF demodulator 210, shown in FIG. 2, does not provide a baseband signal. Thus, the FIR filter 316 operates in the passband (away from DC). The FIR filter 316 is fully described at any given instant by its vector of tap weights (or coefficients) and written as a vector of impulse response coefficients f=[$f_0$ $f_1$ ... $f_{N}$–1]$^T$ where each of the values $f_0$ through $f_{N-1}$ is a complex value. Similarly, the vector of tap weights for the feedback or IIR filter is fully described by a vector of impulse response coefficients g=[$g_0$ $g_1$ ... $g_{L-1}$]$^T$, where each of the values $g_0$ through $g_{L-1}$ is a complex value. The input signal to the FIR filter is the vector r and the output signal of the FIR filter is the scalar y=$r_T$f. The input signal to the IIR filter is the vector z and the output signal of the IIR filter is the scalar w=$z^T$g. The output signal of the IIR filter is subtracted from the signal y in the subtracter 318 to produce the signal x. It is this signal x which is de-rotated and applied to the carrier loop circuitry 323.

The carrier loop circuitry 323 generates a carrier signal corresponding to the carrier frequency of the passband signal provided by the RF demodulator 210 (shown in FIG. 2). This circuitry does not rely on the pilot signal because, as described above, the frequency and phase of the pilot signal may, in some VSB signals, be severely attenuated or it may be corrupted due to multipath distortion. The carrier signal recovered by the carrier loop circuitry 323 is used to exactly demodulate the VSB signal to baseband in order to recover the data values. Exemplary carrier loop circuitry is described in the above referenced patent application to Strolle et al. The equalizer and carrier loop circuitry shown in FIG. 3A operate in two modes, acquisition and tracking. When the circuitry is operated in acquisition mode, the switch S4 connects the output port of the subtracter 318 directly to the input port of the IIR filter element 330. The equalizer is configured as a linear structure:

When the circuitry is used for tracking, switch S4 is switched to add the slicer 324 into the feedback loop. The equalizer is configured as a nonlinear DFE structure. In the exemplary embodiment of the invention, the slicer 324 is part of carrier loop circuitry 323. In this configuration, the output signal of the IIR filter element 330 is subtracted from the output signal of the FIR filter 316 and then shifted to baseband by multiplying it, in the mixer 322, by $e^{j\Theta_k}$ ok the current estimate of the complex conjugate of the residual carrier offset. The baseband signal is then quantized by the slicer 324 in order to form the error calculations used to update the equalizer coefficients, as described in the above-referenced patent application to Strolle et al. The baseband signal is shifted back into the passband by multiplication, in the mixer 326 by $e^{-j\Theta_k}$, the current estimate of the residual carrier offset. The output signal of the mixer 326 is then fed back into the input port of the IIR filter element 330 via switch S4. The input signals to the carrier loop circuitry 323 are the input signal to the slicer 324 and the output signal of the slicer 324.

The embodiments of the invention described below use a VSB slicer that includes a partial trellis decoder.

FIG. 3B is an alternative embodiment of the adaptive equalizer structure. In the embodiment shown in FIG. 3B, the FIR filter section 316 processes passband signals while the IIR filter section, including the subtracter 318 and the IIR filter element 330, processes baseband signals. In FIG. 3B, elements 310 and 316 operate in the same way as shown in FIG. 3A. In the equalizer shown in FIG. 3B, however, the passband signal provided by the FIR filter 316 is converted to a baseband signal by mixer 320, that multiplies the passband signal by $e^{j\Theta_k}$, the current estimate of the complex conjugate of the residual carrier signal. The output signal of mixer 320 is then applied to the subtracter 318, which subtracts the output signal of the IIR element 330 from the output signal of the mixer 320. The output signal of the subtracter 318 is then applied directly to one pole of switch S4 and through slicer 324 to the other pole of switch S4. When operating in acquisition mode, switch S4 applies the output signal of the subtracter 318 to the input port of the IIR filter element 330. When operating in tracking mode, switch S4 applies the output signal of the slicer 324 to the input port of the IIR filter element 330. As with the embodiment shown in FIG. 3A, the input signals to the carrier loop circuitry 323 are the input signal to the slicer 324 and the output signal of the slicer 324.

The symbol values returned by the slicers 324 are a key feature of the equalizers shown in FIGS. 3A and 3B. In these exemplary embodiments, the slicers 324 are being used for equalizer filtering and adaptation as well as for carrier phase tracking.

To determine how a code may be effectively decoded, it is desirable to study the codes currently used in the state of the art. Generally the state of the art uses "Set-Partition Codes" or "Coset Codes", and will be referred to as set-partition codes in the following. These codes use a feedback convolution code and a subset mapping technique, as described in an article by G. Ungerbbeck, entitled, "Trellis-Coded Modulation with Redundant Signal Sets Part I and II", *IEEE Transactions on Communications*, February 1987, which is incorporated herein by reference for its teaching on set partition codes.

Figure 4:
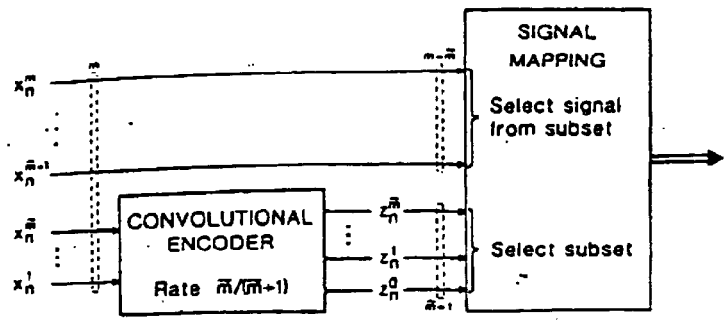
FIG. 4 (prior art) is a block diagram of an encoder modulator for trellis coded modulation.
Figure 5:
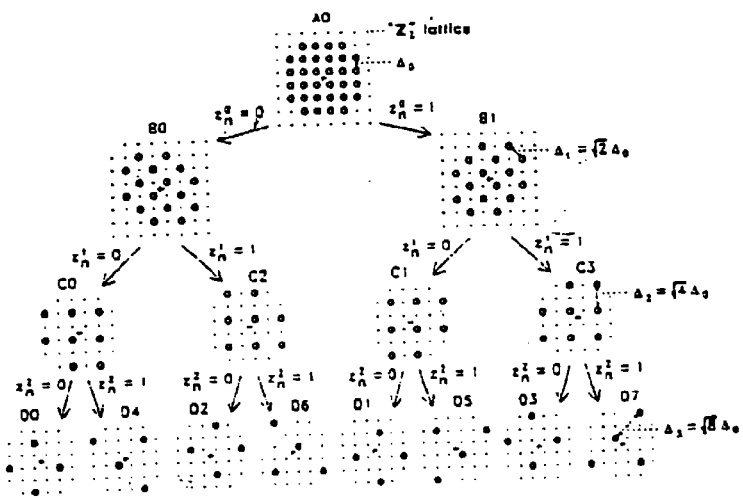
FIG. 5 (prior art) is a code constellation decomposition diagram which is useful for describing the operation of the encoded modulator shown in FIG. 2.
Figure 6:
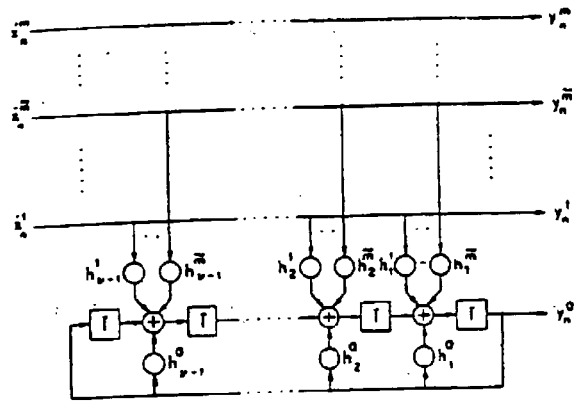
FIG. 6 (prior art) is a block diagram of a generalized convolutional encoder structure with feedback.
Figure 7A:
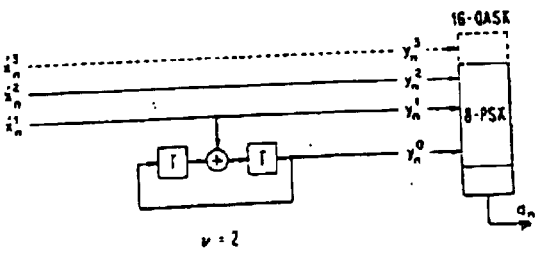
FIGS. 7A, 7B and 7C (all prior art) are block diagrams of exemplary specific convolutional encoders with feedback.
Figure 7B:
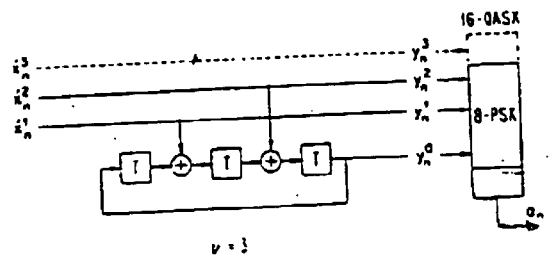
Figure 7C:
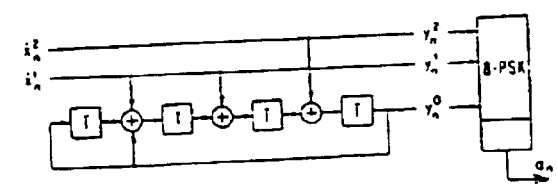

An example of a set partition encoder is shown in FIG. 4, which is copied from the above-referenced article by Ungerboeck. The coded bits select subsets of a specific constellation as shown, for example, in FIG. 5. The uncoded bits then select individual points within the constellation. Note that the distance between signal points increases by a factor of the square root of 2 as shown in FIG. 4. It is noted that the description of distances in this article are erroneous. Nonetheless, if the coded bits can somehow be 'predicted' then an appropriate slicer can be selected, and because of the greater inter-symbol distance in the constellations, this slicer will provide better decisions than a simple slicer.

The method of predicting the coded bits relies on a second property of the set-partition codes: the use of a feedback convolutional encoders with a certain characteristic to generate the codes. The class of these feedback encoders includes those that are used to maximize the minimum Euclidean distance as described in an article by G. Ungerboeck, entitled, "Channel Coding With Multilevel/Phase Signals", *IEEE Transactions on Information Theory*, January 1982', which is incorporated herein by reference for its teaching on set partition codes. This class of feedback encoders has the property that some coded bits (at least the last coded bit shown as Z0(n)) are determined uniquely one interval before the bits are used. This is illustrated by FIGS. 6 and 7A through 7C. Note that in FIGS. 7A through 7C, the 'coded bit' y0(n) is determined one symbol interval before the current symbol. Hence, the previous state estimate can be used to determine y0(n+1). Clearly, this observation can be generalized to the case of many coded bits being estimated.

Many methods can now be used to generate an estimate of the coded bits. Generally, a trellis decoder uses a Viterbi Algorithm (VA) with path length >>2, as described in a text book by A. Viterbi et al. entitled *Principles of Digital Communications and Coding* which is incorporated herein by reference for its teaching on trellis encoding and decoding.

The present invention is embodied in a slicer that provides a better estimate for the feedback portion of the DFE than a slicer which uses no coding information. In addition, the complexity of the trellis decoder and the decision-feedback portion is not increased. Furthermore, no delay is incurred by use of the slicer. Hence, this approach provides a better estimate of the symbol than the nearest element decision device with no delay compared to a Viterbi decoder.

The slicer may be used with a class of codes generally referred to as "Set Partition Codes" or "Coset Codes." The slicer relies on two properties of these codes: the use of a set-partitioned signal mapper and the use of a feedback convolutional code. The slicer generates an estimate of some of the coded bits and then uses this estimate to select a slicer from among a set of slicers. Several exemplary methods are described to generate an estimate of the coded bits.

The most complex of these methods is to use a complete trellis decoder with path length=2. In this case, the trellis decoder computations are desirably finished to generate the estimate of the coded bits, then the coded bits are used to generate the output signal of the slicer. This output signal is then used in the feedback filter of the DFE for filtering and adaptation. These steps imply, however, that both the output signal of the feedback filter and the trellis decoder computation are completed within one symbol interval.

The simplest of the described methods for generating an estimate of the coded bits is to use a complete trellis decoder with path length=1. In this case, the computations performed by the feedback filter and the trellis decoder are done in parallel, i.e., the estimate of the coded bits is done before the next signal sample is available. Hence the slicer selection for the current symbol is implemented before the current symbol is available. This implementation is very simple.

Another method of generating an estimate of the coded bits is to use only a subset of states for the selection of the coded bits, but to keep track of the full trellis decoder after the estimation of the coded bits is complete. Using this method, the computations performed during a symbol interval include first computing an estimate of coded bits, then in parallel, using the output signal of the slicer to compute the feedback portion of the DFE, thus completing the trellis decoder computation. This method can use ideas from the M-algorithms, described in the above-referenced book by Viterbi et al., and selects the best M states to make the estimation of the coded bits.

Finally, a simplified mechanism of generating an estimate of the coded bit for the VSB system is described, which method is specified relative to the ATSC trellis encoder.

For the purpose of describing the invention, the VSB trellis code as used in the ATSC system is used as an example. It is contemplated, however, that the subject invention has general application to other systems which use trellis codes or other Viterbi-type encoding techniques.

Figure 8:
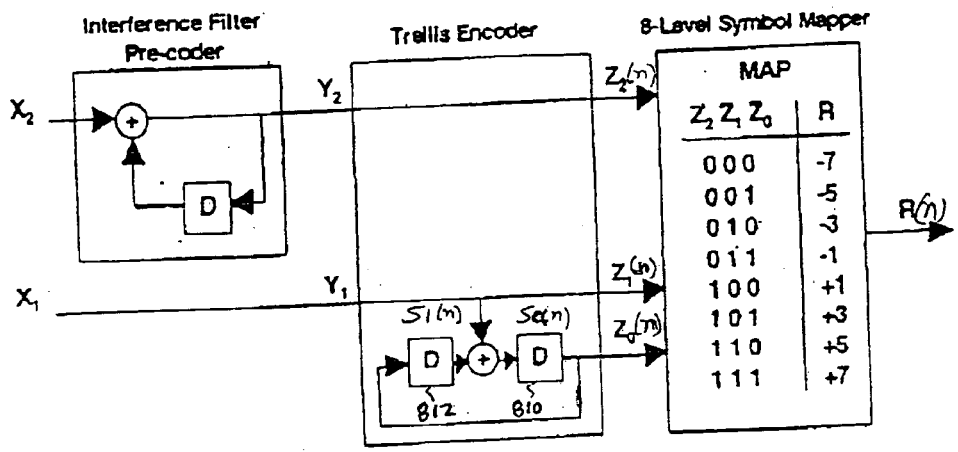
FIG. 8 (prior art) is a block diagram of an exemplary trellis encoder as specified for digital television signals in the standard specified by the Advanced Television System Committee (ATSC).

The ATSC trellis encoder shown in FIG. 8 defines states $S_1(n)$ and $S_0(n)$ as the current input samples to the delay elements. Note that, by operation of the delay elements 810 and 812, the trellis encoder shown in FIG. 8 is constrained by equations (1) and (2).

$$Z_0(n)=S_0(n-1) \tag{1}$$

$$Z_0(n)=S_1(n) \tag{2}$$

The trellis code output (R(n)) is completely specified by the previous state $(S_1(n-1), S_0(n-1))$ and the current inputs $Z_1(n)$ and $Z_2(n)$. Specifically, the bit $Z_0(n)$ can be specified by the previous states $(S_1(n-1), S_0(n-1))$ and the current input $Z_1(n)$.

Figure 9A:
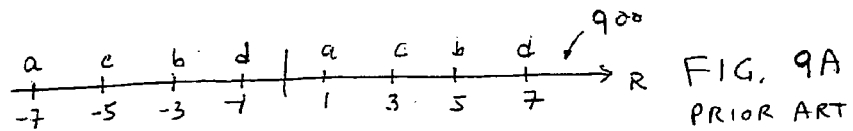
FIG. 9A (prior art) is a constellation diagram for the trellis encoder shown in FIG. 6.
Figure 9B:
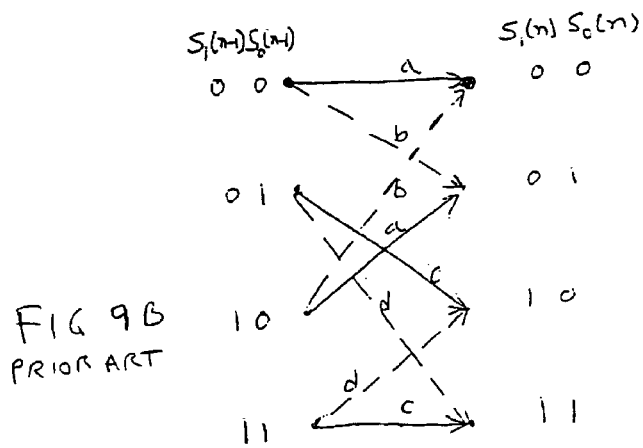
FIG. 9B (prior art) is a trellis diagram for the trellis encoder shown in FIG. 6.

Such a relationship may be described using the constellation 900 shown in FIG. 9A and the corresponding trellis diagram shown in FIG. 9B. In FIG. 9B, The branches specify a transition from a specific state $(S_1(n-1), S_0(n-1))$ of the trellis encoder to another state $(S_1(n), S_0(n))$ given the input bit $Z_1(n)$. A broken line branch represents a transition when $Z_1(n)=0$, and a solid line represents a transition when $Z_1(n)=1$. Also listed on top of the transitions are one of the four subsets 'a', 'b', 'c'. or 'd' that are defined as follows.

'a':$\{-7,1\}$ (corresponds to $Z_1(n)=0$ and $Z_0(n)=0$)
'b':$\{-3,5\}$ (corresponds to $Z_1(n)=1$ and $Z_0(n)=0$)
'c':$\{-5,3\}$ (corresponds to $Z_1(n)=0$ and $Z_0(n)=1$)
'd':$\{-1,7\}$ (corresponds to $Z_1(n)=1$ and $Z_0(n)=1$)

Thus the trellis diagram of FIG. 9B completely specifies the next state as well as the next output given the new input to the state diagram. Note that the bit $Z_2(n)$ selects one of two signal points from subsets 'a', 'b', 'c', or 'd'.

Figure 10:
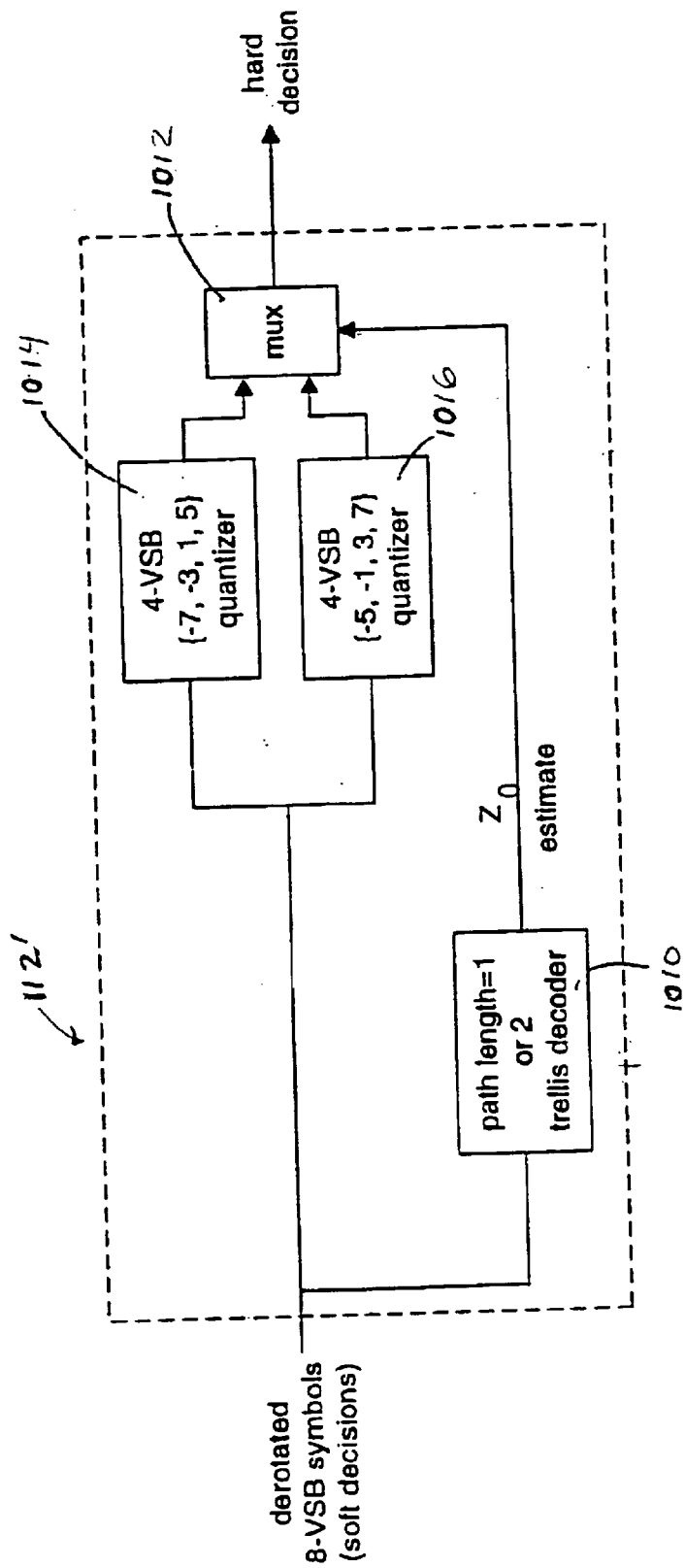
FIG. 10 is a block diagram of a first exemplary symbol slicer according to the present invention.
Figure 11:
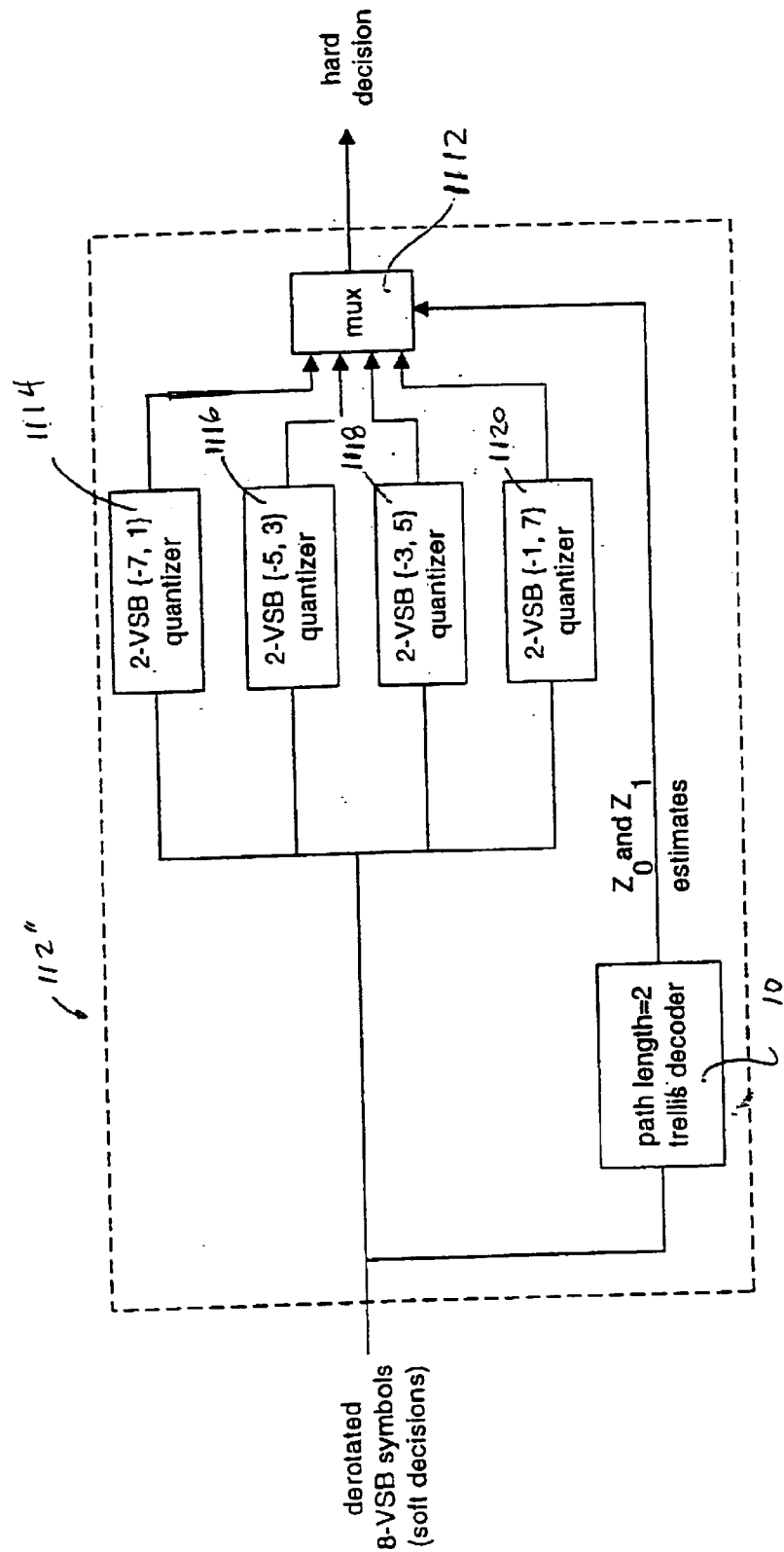
FIG. 11 is a block diagram of a second exemplary symbol slicer according to the present invention.

The receiver shown in FIGS. 2 and 3A or 3B uses a slicer according to the present invention. This slicer provides an estimate $Z_0(n)$. Exemplary slicers for VSB are shown in FIGS. 10 and 11. A first exemplary implementation estimates a single bit, $Z_0$, of the three bit symbol. FIG. 10 shows an exemplary implementation of a slicer 324 (shown in FIGS. 3A and 3B) when bit $Z_0$ is known. As shown in this implementation the 8 VSB constellation may be decomposed into the disjoint union of two 4 VSB constellations. In this exemplary embodiment, a trellis decoder 1010 may be used to estimate the one bit $Z_0$, and this value may then be used to control the multiplexer 1012 to select the symbols from one of two disjoint 4 VSB quantizers 1014 and 1016. For example, the 8 VSB constellation can be decomposed as set forth in equation (3).

$$8 \text{ VSB}=\{-7,-3, 1, 5\}\cup\{-5,-1, 3,7\} \tag{3}$$

where the first 4 VSB subset, (quantizer 1014) corresponds to $Z_0=0$ and the second VSB subset (quantizer 1016) corresponds to $Z_0=1$ respectively.

While a general trellis decoder 1010 can be used to estimate $Z_0$, it is desirable that the estimate for $Z_0$ be available within one symbol interval. The decoder becomes more complicated if the estimate is not available within one symbol interval because inter-symbol interference (ISI) cancellation is less reliable. First, the decision feedback cannot be done within one symbol interval. Assuming that the $Z_0$ estimate is available N trellis encoded symbols later (e.g. because the ATSC standard specifies 12 parallel trellis encoders, the decision feedback cannot be done for 12*N symbols periods). Furthermore, the computation of the error term is also delayed. Consequently, the data values are stored to implement an LMS-like adaptive algorithm. The longer the delay, the larger the storage area to hold the data values. Hence, it is desirable to get an estimate of $Z_0$ in the same symbol interval in which the value including $Z_0$ is decoded.

In general, trellis decoders are well known in the art and use the Viterbi Algorithm as described in the above-referenced text by Viterbi et al. During every interval, path metrics corresponding to every state are computed in accordance with a trellis diagram such as that shown in FIG. 9. The path metrics are defined as $p_0(n)$, $p_1(n)$, $p_2(n)$, $p_3(n)$ for the four-state trellis corresponding to states $S_1(n), S_0(n)=(0,$ 0), (0,1), (1,0), (1,1) respectively. The branch metrics, bm, for the branches in the trellis are denoted as shown in equations (4)–(7).

$$bm(`a')=\text{Euclidean distance (current sample, subset ('a'))} \quad (4)$$

$$bm(`b')=\text{Euclidean distance (current sample, subset ('b'))} \quad (5)$$

$$bm(`c')=\text{Euclidean distance (current sample, subset ('c'))} \quad (6)$$

$$bm(`d')=\text{Euclidean distance (current sample, subset ('d'))} \quad (7)$$

Then the path metrics are computed every symbol interval according to the Viterbi Algorithm as shown in equations (8)–(11).

$$p_0(n)=\text{minimum } \{p_0(n-1)+bm(`a'), p_2(n-1)+bm(`b')\} \quad (8)$$

$$p_1(n)=\text{minimum } \{p_0(n-1)+bm(`b'), p_2(n-1)+bm(`a')\} \quad (9)$$

$$p_2(n)=\text{minimum } \{p_1(n-1)+bm(`c'), p_3(n-1)+bm(`d')\} \quad (10)$$

$$p_3(n)=\text{minimum } \{p_1(n-1)+bm(`d'), p_3(n-1)+bm(`c')\} \quad (11)$$

This notation is used below to describe the different methods for estimating $Z_0(n)$.

Case 1: Path Memory=2

In this case, the $Z_0(n)$ estimate is based on path metrics $p_0(n)$, $p_1(n)$, $P_2(n)$, $p_3(n)$. If the minimum path metric, p, among $\{p_0(n), p_1(n), P_2(n), p_3(n)\}$ corresponds to either states 0 or 1 (i.e. $p_0(n)$ or $p_1(n)$) then the estimate for $Z_0(n)$ equals 0, otherwise the estimate equals 1. The rationale for this selection is based on equation (2) above. This case may be described by equation (12).

$$Z_0(n)=0 \text{ if minimum } \{p_0(n), p_1(n)\} < \text{minimum } \{p_2(n), p_3(n)\} \quad (12)$$

=1 otherwise

Case 2: Path Memory 1

In this case, the $Z_0(n)$ estimate is based on path metrics $p_0(n-1)$, $p_1(n-1)$, $p_2(n-1)$, $p_3(n-1)$. If the minimum path metric among $\{p_0(n-1), p_1(n-1), p_2(n-1), p_3(n-1)\}$ corresponds to either states 0 or 2, then the estimate for $Z_0(n)$ equals 0, otherwise the estimate equals 1. The rationale for this selection is based on equation (1) above. This case may be described by equation (13)

$$Z_0(n)=0 \text{ if minimum } \{p_0(n-1), p_2(n-1)\} < \text{minimum } \{p_1(n-1), p_3(n-1)\} \quad (13)$$

=1 otherwise.

Clearly the advantage of this case over path memory=2 case is that the computation of the estimate for $Z_0(n)$ can be made before the signal sample is available.

Case 3: Path Memory=2, (low complexity)

In this case, the estimate of $Z_0(n)$ is based on path metrics $\{p_0(n-1), p_1(n-1), p_2(n-1), p_3(n-1)\}$, and on 'extending' the two best states corresponding to the minimum two path metrics from among $\{p_0(n-1), p_1(n-1), p_2(n-1), p_3(n-1)\}$. In this case, the possible results are given by the conditional statements shown in Tables 1 and 2.

TABLE 1

| If $p_0(n-1)$ and $p_2(n-1)$ are the best states then $Z_0(n) = 0$ |
| If $p_1(n-1)$ and $p_3(n-1)$ are the best states then $Z_0(n) = 1$ |

TABLE 2

| If $p_0(n-1)$ and $p_1(n-1)$ are the best states then |
|   if minimum $\{p_0(n-1) + bm(`a'), p_0(n-1) + bm(`b')\}$ |
|     <minimum $\{p_1(n-1) + bm(`c'), p_1(n-1) + bm(`d')\}$ then |
|     $Z_0(n) = 0$ |
|   else $Z_0(n) = 1$ |

It is possible to simplify the final computation in Table 2 to:

if $p_0(n-1)+bm(`ab') < p_1(n-1)+bm(`cd')$ then $Z_0(n)=0$ else $Z_0(n)=1$

Where $bm(`ab')$ is given by equation (14) and $bm(`cd')$ is given by equation (15).

$$bm(`ab')=\text{Euclidean distance (current sample, } Z_0=0 \text{ slicer)}=\text{Euclidean distance(current sample, } \{-7,-3,1,5\}) \quad (14)$$

$$bm(`cd')=\text{Euclidean distance (current sample, } Z_0=1 \text{ slicer)}=\text{Euclidean distance (current sample, } \{-5,-1,3,7\}) \quad (15)$$

The expression in Table 2 may be used for the rest of the pairs of path metrics $\{p_0(n-1), p_3(n-1))$, $\{p_2(n-1), p_1(n-1)\}$; and $\{p_2(n-1), p_3(n-1)\}$ by substituting $p_2(n-1)$ for $p_0(n-1)$ and by substituting $p_3(n-1)$ for $p_1(n-1)$ wherever appropriate.

Clearly in this case, only one comparison is implemented to determine the $Z_0(n)$ estimate and thus this case is of lower complexity than case 1.

Given these methods of estimating $Z_0(n)$, the input sample is quantified from one of two 4 VSB subsets. The symbol error for 4 VSB at the SNR corresponding to the ATSC threshold of visibility (TOV) is well below the rule of thumb of one in ten. Hence, the smart-slicer can provide reliable symbol quantization for decision-directed operation even at the ATSC specified TOV.

So far the exemplary methods have calculated only the estimate of the bit $Z_0(n)$. It is possible, however, to estimate the bit $Z_1(n)$ as well. In this option, the bits $Z_0(n)$ and $Z_1(n)$ are estimated and the 8 VSB constellation may be decomposed into a disjoint union of four 2 VSB subsets as set forth in equation (16)

$$8 \text{ VSB}=\{-7,1\}\cup\{-5,3\}\cup\{-3,5\}\cup\{-1,7\}=`a'\cup`c'\cup`b'\cup`d' \quad (16)$$

where the four 2 VSB subsets correspond to $(Z_1,Z_0)=(0,0)$, (0,1), (1,0), (1,1) respectively. An implementation of this slicer 112" is shown in FIG. 11, where a path length=2 trellis decoder 1110 generates estimates of $Z_0$ and $Z_1$ and applies these estimates as control signals to a multiplexer 1112. The multiplexer 1112 divides the symbols among quantizers 1114, 1116, 1118; and 1120 according to the values of $Z_0$ and $Z_1$.

The bits $Z_0$ and $Z_1$ may be estimated using the conditional statements of Table 1 shown above for Path Memory=2. Given $p_0(n), p_1(n), p_2(n), p_3(n)$, the process calculates the minimum path metric among $(p_0(n), p_1(n), p_2(n), p_3(n)\}$, then determines whether the path that was selected for the minimum path metric corresponds to either $Z_1(n)=0$ or $Z_1(n)=1$ (i.e., either the dotted or the solid line in FIG. 7B). The $Z_0(n)$ estimate may be calculated as described above. Hence, using the method outlined above, both the $Z_0(n)$ and $Z_1(n)$ estimates are available.

For the reduced complexity Case 2 described above, a further determination may be made of whether the path selected for the minimum path metric corresponding to either $Z_1(n)=0$ or 1 (as described above) may be used as an estimate of $Z_1(n)$.

While this technique has been described only for the ATSC trellis code, it is clear from the above discussion that it can be applied for any feedback trellis encoder that may be partitioned into distinct sets. In particular, although the discussion set forth above describes a three-bit trellis code, it is contemplated that the same method may be applied to trellis codes that represent digital values having four or more bits. In addition, although the exemplary embodiments of the invention generate estimates for one or two bits to decode the remaining bits, it is contemplated that more bits may be estimated using extensions of the apparatus and method described above.

Figure 12:
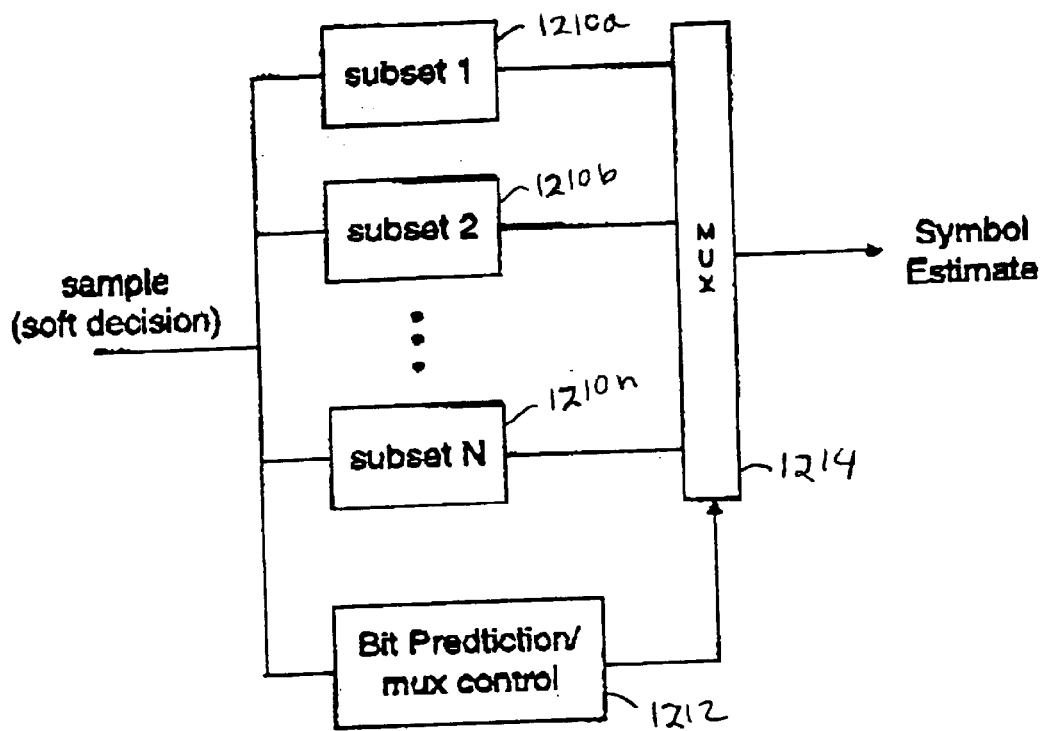
FIG. 12 is a block diagram of a third exemplary symbol slicer according to the present invention.

In general, the techniques described above may be used to implement a decoder of the type shown in FIG. 12. In this Figure, the code is divided into N subsets, each corresponding to one of the trellis decoders 1210a through 1210n. input samples are applied to the decoder so that each of the trellis decoders 1210a through 1210n acts on the input samples in parallel. At the same time, the samples are processed by a bit prediction/multiplexer control processor 1212, which, using the techniques described above, generates an estimate for a subset of the bits of the digital values that defines which one of the trellis decoders 1210a through 1210n is most likely to produce the correct result. The output signal of the processor 1212 is applied to a multiplexer 1214 that selects the output signal of the appropriate decoder 1210a through 1210n as the symbol estimate.

In the embodiment shown in FIG. 12, the bit prediction and multiplexer control processor 1214 may implement any of the bit estimation techniques described above.

While the invention has been described in terms of exemplary embodiments, it may be practiced as outlined above within the scope of the appended claims.

What is claimed:

1. A decoder and quantizer that is used to recover N-bit symbols, where N is an integer greater than two, from successive channel impaired input samples representing a signal encoded according to a trellis code, wherein the trellis code defines a constellation, the decoder and quantizer comprising:
   a plurality of decision devices, each decision device corresponding to a subset of the constellation defined for the trellis code;
   a partial trellis decoder that generates an estimate of the subset to which a current symbol belongs based on respective estimates of a current sample and a previous sample and, responsive to the estimate of the subset, selects one decision device of the plurality of decision devices to generate an estimate of the N bits.

2. A decoder and quantizer according to claim 1, wherein the trellis code is a set partitioned code using feedback convolutional encoding and the partial trellis decoder computes path metrics for the current symbol based on previously computed path metrics of the previous sample and determines a best path metric from among all path metrics computed for the previous sample to select the one decision device.

3. A decoder and quantizer according to claim 1, wherein the trellis code is a set-partitioned code which defines a state-transition diagram and the partial trellis decoder computes path metrics for the current symbol based on previously calculated path metrics of the previous sample and determines a best path from path metrics computed for the current symbol, corresponding to a subset of the states for the previous sample, to select the one decision device.

4. A decoder and quantizer according to claim 3, further including a classifier for identifying ones of the path metrics computed for the previous sample as better path metrics than other ones of the path metrics computed for the previous sample, wherein the subset of states selected for the previous sample are states corresponding to the identified better path metrics.

5. A decoder according to claim 4, wherein each path metric includes a measure of Euclidean distance.

6. An equalizer for a digital demodulator that demodulates a trellis coded signal having channel impaired symbols that have been digitally coded according to a constellation and then modulated onto a carrier wave, the equalizer comprising:
   a finite impulse response (FIR) filter coupled to receive the trellis coded signal as a passband signal and to provide a first filtered output signal;
   an infinite impulse response (IIR) filter, including a summing circuit having a first input port coupled to receive the first filtered output signal and an output port coupled to an IIR filter element, the IIR filter element being coupled to provide an output signal to a second input port of the summing circuit, the IIR filter providing a second filtered output signal at the output port of the summing circuit; and
   a slicer that is selectively coupled between the output port of the summing circuit and the IIR filter element, the slicer including:
   a plurality of decision devices, each decision device corresponding to a subset of the constellation defined for the trellis code;
   a partial trellis decoder that generates an estimate of the subset to which a current channel impaired symbol belongs based on respective estimates of a current sample and on a previous sample and, responsive to the estimate of the subset, selects one decision device of the plurality of decision devices to generate the estimate of the current channel impaired symbol.

7. An equalizer according to claim 6, wherein both the FIR filter and the IIR filter process passband signals to provide a passband signal as the second filtered signal.

8. An equalizer according to claim 7, further comprising:
   a first mixer coupled to the output port of the summing circuit and coupled to receive an estimated residual carrier signal, for demodulating the output signal of the summing circuit to provide a baseband signal as an input signal to the slicer;
   a second mixer coupled to the slicer and coupled to receive a further estimated residual carrier signal for remodulating the output signal of the slicer to provide a passband signal to the IIR filter element; and
   carrier loop circuitry, coupled to receive the input signal to the slicer and the output signal of the slicer, and to provide the estimated residual carrier signal and the further estimated residual carrier signal to the first and second mixers.

9. An equalizer according to claim 6, wherein the first filtered signal provided by the FIR filter is a passband signal and the equalizer further comprises a mixer coupled between the FIR filter and the IIR filter and coupled to receive an estimated residual carrier signal to transform the first filtered signal into a baseband signal, and the IIR filter is configured to process the baseband signal to produce a further baseband signal as the second filtered signal; and
   the equalizer further includes carrier loop circuitry, coupled to receive respective input signals from the output port of the summing circuit and the output port of the slicer and to provide the estimated residual carrier signal to the mixer.

10. An equalizer according to claim 6, wherein the constellation defines a code set that is a set partitioned code using feedback convolutional encoding and the partial trellis decoder computes path metrics for a current symbol based on previously computed path metrics of a previous symbol and determines a best path metric from among all path metrics computed for the previous symbol to select the one decision device.

11. An equalizer according to claim 6, wherein the trellis code is a set-partitioned code that defines a state-transition diagram and the partial trellis decoder computes path metrics for the current channel impaired symbol based on previously calculated path metrics of a previous symbol and determines a best path from path metrics computed for the current symbol, corresponding to a subset of the states for the previous symbol, to select the one decision device.

12. An equalizer according to claim 11, further including a classifier for identifying ones of the path metrics computed for the previous symbol as better path metrics than other ones of the path metrics computed for the previous symbol, wherein the subset of states selected for the previous symbol are states corresponding to the identified better path metrics.

13. A decoder according to claim 12, wherein each path metric includes a measure of Euclidean distance.

14. A decoder according to claim 6, wherein the plurality of decision devices consists of four decision devices, each decision device corresponding to two respective elements of the constellation defined by the trellis code.

15. An equalizer according to claim 6, wherein the trellis code is compliant with a standard for digital television terrestrial broadcast adopted by the Advanced Television Systems Committee (ATSC).

16. An equalizer for a digital demodulator that demodulates a trellis coded signal having channel impaired symbols that have been digitally coded according to a constellation and then modulated onto a carrier wave, the equalizer comprising:

a finite impulse response (FIR) filter coupled to receive a the trellis coded signal as a baseband signal and to provide a first filtered output signal;

an infinite impulse response (IIR) filter, including a summing circuit having a first input port coupled to receive the first filtered output signal and an output port coupled to an IIR filter element, the IIR filter element being coupled to provide an output signal to a second input port of the summing circuit the IIR filter providing a second filtered output signal at the output port of the summing circuit; and a slicer that is selectively coupled between the output port of the summing circuit and the IIR filter element, the slicer including:

a plurality of decision devices, each decision device corresponding to a subset of the constellation defined for the trellis code;

a partial trellis decoder that generates an estimate of the subset to which a current channel impaired symbol belongs based on respective estimates of a current sample and a previous sample and, responsive to the estimate of the subset, selects one decision device of the plurality of decision devices to generate the estimate of the current channel impaired symbol.

17. An equalizer for a digital demodulator that demodulates a trellis coded signal having channel impaired symbols that have been digitally coded according to a constellation and then modulated onto a carrier wave, the equalizer comprising:

a finite impulse response (FIR) filter coupled to receive a the trellis coded signal as a passband signal and to provide a first filtered output signal;

an infinite impulse response (IIR) filter, including a summing circuit having a first input port coupled to receive the first filtered output signal and an output port coupled to an IIR filter element, the IIR filter element being coupled to provide an output signal to a second input port of the summing circuit, the IIR filter providing a second filtered output signal at the output port of the summing circuit; and a slicer that is selectively coupled between the output port of the summing circuit and the IIR filter element, the slicer including:

a plurality of decision devices, each decision device corresponding to a subset of the constellation defined for the trellis code;

a partial trellis decoder that generates an estimate of the subset to which a current channel impaired symbol belongs based on an estimate of a previous sample and, responsive to the estimate of the subset, selects one decision device of the plurality of decision devices to generate the estimate of the current channel impaired symbol.

18. An equalizer according to claim 17, wherein both the FIR filter and the IIR filter process passband signals to provide a passband signal as the second filtered signal.

19. An equalizer according to claim 17, further comprising:

a first mixer coupled to the output port of the summing circuit and coupled to receive an estimated residual carrier signal, for demodulating the output signal of the summing circuit to provide a baseband signal as an input signal to the slicer;

a second mixer coupled to the slicer and coupled to receive a further estimated residual carrier signal for remodulating the output signal of the slicer to provide a passband signal to the IR filter element; and carrier loop circuitry, coupled to receive the input signal to the slicer and the output signal of the slicer, and to provide the estimated residual carrier signal and the further estimated residual carrier signal to the first and second mixers.

20. An equalizer according to claim 17, wherein the first filtered signal provided by the FIR filter is a passband signal and the equalizer further comprises a mixer coupled between the FIR filter and the IIR filter and coupled to receive an estimated residual carrier signal to transform the first filtered signal into a baseband signal, and the IIR filter is configured to process the baseband signal to produce a further baseband signal as the second filtered signal; and the equalizer further includes carrier loop circuitry, coupled to receive respective input signals from the output port of the summing circuit and the output port of the slicer and to provide the estimated residual carrier signal to the mixer.

21. An equalizer according to claim 17, wherein the constellation defines a code set that is a set partitioned code using feedback convolutional encoding and the partial trellis decoder computes path metrics for a current symbol based on previously computed path metrics of a previous symbol and determines a best path metric from among all path metrics computed for the previous symbol to select the one decision device.

22. An equalizer according to claim 17, wherein the trellis code is a set-partitioned code that defines a state-transition diagram and the partial trellis decoder computes path metrics for the current symbol based on previously calculated path metrics of the previous symbol and determines a best path from path metrics computed for the current symbol, corresponding to a subset of the states for the previous symbol, to select the one decision device.

23. An equalizer according to claim 17, further including a classifier for Identifying ones of the path metrics computed for the previous symbol as better path metrics than other ones of the path metrics computed for the previous symbol, wherein the subset of states selected for the previous symbol are states corresponding to the identified better path metrics.

24. A decoder according to claim 23, wherein each path metric includes a measure of Euclidean distance.

25. A decoder according to claim 17, wherein the plurality of decision devices consists of four decision devices, each decision device corresponding to two respective elements of the constellation defined by the trellis code.

26. An equalizer according to claim 17, wherein the trellis code is compliant with a standard for digital television terrestrial broadcast adopted by the Advanced Television Systems Committee (ATSC).

* * * * *